(12) United States Patent
Kaminski et al.

(10) Patent No.: US 6,965,185 B1
(45) Date of Patent: Nov. 15, 2005

(54) VARIABLE PITCH MANIFOLD FOR ROTOR COOLING IN AN ELECTRICAL MACHINE

(75) Inventors: Christopher Anthony Kaminski, Schenectady, NY (US); Anand Shankar Tanavde, Slingerlands, NY (US); Robert John Nygard, Saratoga Springs, NY (US); Sang Woo Lee, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/709,740

(22) Filed: May 26, 2004

(51) Int. Cl.[7] .................................................. H02K 1/24
(52) U.S. Cl. ........................ 310/261; 310/52; 310/55; 310/61
(58) Field of Search ........................... 310/261, 55, 52, 310/61

(56) References Cited

U.S. PATENT DOCUMENTS

| | | | |
|---|---|---|---|
| 3,271,600 A * | 9/1966 | Philofsky ...................... | 310/55 |
| 3,435,263 A * | 3/1969 | Willyoung ..................... | 310/61 |
| 3,439,202 A * | 4/1969 | Wanke .......................... | 310/52 |
| 4,278,905 A * | 7/1981 | Chari et al. ................... | 310/52 |
| 4,342,932 A * | 8/1982 | Glebov et al. ................. | 310/52 |
| 4,363,982 A | 12/1982 | Kaminski | |
| 4,543,503 A | 9/1985 | Kaminski et al. | |
| 4,667,125 A | 5/1987 | Kaminski et al. | |
| 4,709,177 A | 11/1987 | Kaminski | |
| 4,814,655 A | 3/1989 | Kaminski | |
| 5,065,064 A | 11/1991 | Kaminski | |
| 5,281,877 A | 1/1994 | Kazmierczak et al. | |
| 5,358,432 A | 10/1994 | Shih et al. | |
| 5,886,434 A | 3/1999 | Nygard | |
| 5,929,550 A | 7/1999 | Kaminski et al. | |
| 5,986,380 A | 11/1999 | Kaminski et al. | |
| 6,081,178 A | 6/2000 | Wang et al. | |
| 6,169,353 B1 * | 1/2001 | Driscoll et al. .............. | 310/261 |
| 6,181,228 B1 | 1/2001 | Laskaris et al. | |
| 6,194,807 B1 | 2/2001 | Kaminski et al. | |
| 6,198,371 B1 | 3/2001 | Laskaris et al. | |
| 6,201,462 B1 | 3/2001 | Laskaris et al. | |
| 6,239,527 B1 | 5/2001 | Kaminski et al. | |
| 6,246,308 B1 | 6/2001 | Laskaris et al. | |
| 6,291,919 B1 | 9/2001 | Ganti et al. | |
| 6,313,561 B1 | 11/2001 | Nygard et al. | |
| 6,339,268 B1 | 1/2002 | Kaminski et al. | |
| 6,346,753 B1 | 2/2002 | Jarczynski et al. | |
| 6,369,482 B1 | 4/2002 | Rink, Jr. et al. | |
| 6,415,613 B1 | 7/2002 | Ackermann et al. | |
| 6,437,476 B1 | 8/2002 | Nygard et al. | |
| 6,438,969 B1 | 8/2002 | Laskaris et al. | |

(Continued)

FOREIGN PATENT DOCUMENTS

EP             1124304 A2 *   8/2001   ............ H02K 1/24

(Continued)

*Primary Examiner*—Joseph Waks
(74) *Attorney, Agent, or Firm*—Nixon & Vanderhye P.C.

(57) ABSTRACT

A rotor in an electrical machine, the rotor comprises a magnetic core having at least two poles, a plurality of winding assemblies, one for each pole, and a cylindrical tube enclosing the magnetic core and winding assemblies, the tube including a plurality of rings having different axial widths. Each of the rings is axially spaced apart from an adjacent ring. The respective axial widths of the rings become progressively smaller than the axial width of the ring axially located at or near the center of the tube as the axial distance away from the center of the tube increases. A plurality of winding braces are coupled to at least one of the winding assemblies, the winding braces having different radial heights.

24 Claims, 6 Drawing Sheets

U.S. PATENT DOCUMENTS

| | | |
|---|---|---|
| 6,442,949 B1 | 9/2002 | Laskaris et al. |
| 6,448,686 B1 | 9/2002 | Dawson et al. |
| 6,495,942 B1 | 12/2002 | Kaminski et al. |
| 6,509,664 B2 * | 1/2003 | Shah et al. .................. 310/181 |
| 6,794,792 B2 * | 9/2004 | Wang ......................... 310/270 |
| 6,885,120 B2 * | 4/2005 | Kaminski et al. ............. 310/85 |
| 2005/0073215 A1 * | 4/2005 | Wang et al. ................. 310/261 |

FOREIGN PATENT DOCUMENTS

JP        63310367 A   * 12/1988   .......... H02K 55/04

* cited by examiner

VARIABLE PITCH MANIFOLD FOR ROTOR COOLING IN AN ELECTRICAL MACHINE

BACKGROUND OF INVENTION

The present invention relates to electrical machines such as (but not limited to) electrical generators and, more particularly, to a manifold of a generator rotor which promotes uniform cooling of the windings of the generator rotor.

In a conventional generator having a rotor and a stator, the rotor is provided with field windings that excite the generator while receiving a current from an excitation current source. The stator is provided with windings from which electrical power is output. Typical rotor construction requires that a field winding be assembled bar by bar, into radial slots milled into a rotor body. Containment of the rotor field windings is typically achieved using rotor wedges, rotor teeth and retaining rings. A carbon filled reinforced enclosure (CFRE) rotor eliminates the need for the coil slots milled in the rotor shaft and enables the assembly of a field winding as a single winding module, one for each pole. It is known to use individual radial manifolds under each coil module with a fixed axial spacing between discharge or ventilation holes in the manifolds.

It is desirable to provide a more uniform cooling to the rotor windings. By providing a more uniform cooling to the rotor windings, "hot spots" (areas of very high temperatures) may be avoided. The advanced physical deterioration of generator components (e.g., insulation) at these areas can thus be avoided, thereby extending the operational life of the generator.

SUMMARY OF INVENTION

A rotor in an electrical machine comprises a magnetic core having at least two poles, a plurality of winding assemblies, one for each pole, and a cylindrical tube enclosing the magnetic core and winding assemblies. The tube includes a plurality of rings having different axial widths. The tube may be formed of a non-metallic material. Each of the rings may be axially spaced apart from an adjacent ring. The rings may be axially spaced apart such that radial discharge slots defined in the magnetic core are axially aligned with respective spaces between the rings. The respective axial widths of the rings located at both axial ends of the tube may be smaller than the axial width of the ring axially located at or near the center of the tube. The respective axial widths of the rings may become progressively smaller than the axial width of the ring axially located at or near the center of the tube as the axial distance away from the center of the tube increases. The rotor may further comprise a plurality of winding braces coupled to at least one of the winding assemblies, the winding braces having different radial heights. The radial heights of the winding braces located at both axial ends of the tube may be smaller than the radial height of the winding brace axially located at or near the center of the tube. The respective radial heights of the winding braces may become progressively smaller than the radial height of the winding brace axially located at or near the center of the tube as the axial distance away from the center of the tube increases. The rotor may further comprise a plurality of winding braces coupled to at least one of the winding assemblies and axially spaced apart from each other, the axial distance between one pair of adjacent winding braces being different than the axial distance between another pair of adjacent winding braces. The respective axial distances between the winding braces located at the ends of the tube may be smaller than the axial distance between the winding braces located at or near the center of the tube. The respective axial distances between adjacent winding braces may become progressively smaller than the axial distance between adjacent winding braces axially located at the center of the tube as the axial distance away from the center of the tube increases. The rotor may further comprise a shield having a plurality of ventilation holes defined therein, the shield being disposed between (i) the tube and (ii) the magnetic core and winding assemblies. The ventilation holes may be circular or elliptical. The ventilation holes may be aligned in respective rows in the axial direction of the shield, and the respective rows of ventilation holes may be axially aligned with respective axial spaces defined between the rings. The ventilation holes may be aligned in respective rows in the axial direction of the shield and the axial distance between the rows may be non-uniform. The distance between the rows of ventilation holes formed in the shield may become progressively smaller as the axial distance away from the center of the shield increases.

A cylindrical tube for enclosing rotor components including a magnetic core having at least two poles and a plurality of winding assemblies comprises a plurality of rings having different axial widths. The tube may be formed of a non-metallic material. Each of the rings may be axially spaced apart from an adjacent ring. The rings may be axially spaced apart such that radial discharge slots defined in the magnetic core are axially aligned with respective spaces between the rings. The respective axial widths of the rings at both axial ends of the tube may be smaller than the axial width of the ring axially located at or near the center of the tube. The respective axial widths of the rings may become progressively smaller than the axial width of the ring axially located at or near the center of the tube as the axial distance away from the center of the tube increases.

DETAILED DESCRIPTION

Figure 1:
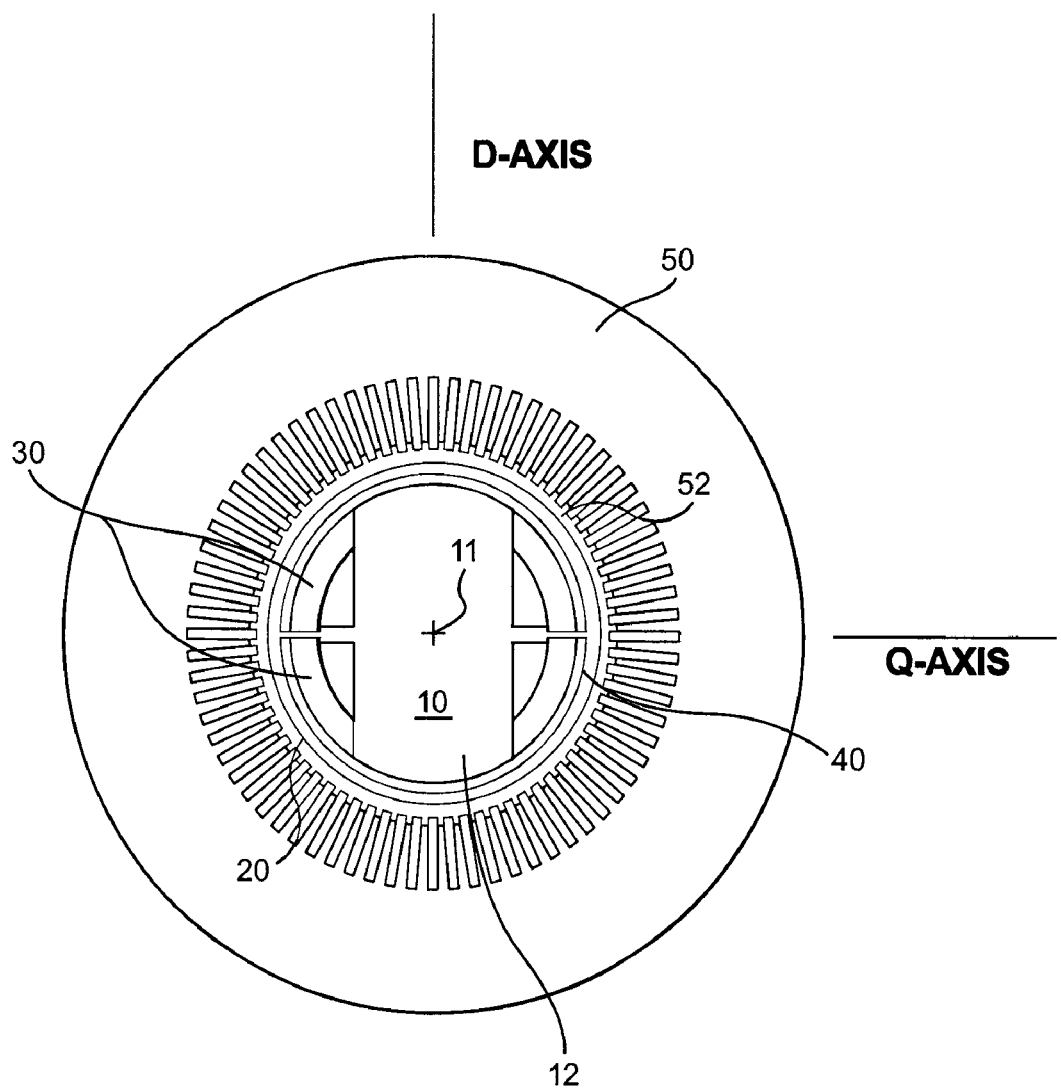
FIG. 1 is a schematic illustration of a rotor, stator, shield and cylindrical enclosure tube of an electrical machine in accordance with an exemplary embodiment of the present invention.

FIG. 1 illustrates an electrical machine such as, but not limited to, a generator including a rotor 10 rotatably mounted within stator 50. Rotor 10 includes a longitudinal axis 11 about which rotor 10 rotates within stator 50, a multi-pole magnetic core 12 (two-pole core shown) and a plurality of winding assemblies 30, one for each pole. Rotor 10 also includes a non-metallic, cylindrical tube 20 enclosing core 12 and winding assemblies 30. Rotor 10 may also include a continuous shield 40 interposed between tube 20 and winding assemblies 30.

After winding assemblies 30 are slid over the parallel sided forging of two-pole magnetic core 12, tube 20 is slid over the assembly. Tube 20 is constructed from a non-metallic low density composite material, such as a carbon fiber-glass fiber composite and is configured to discharge winding ventilation gas to a generator air gap 52 defined between rotor 10 and stator 50. The material forming tube 20 preferably has a high strength to weight ratio.

Figure 2:
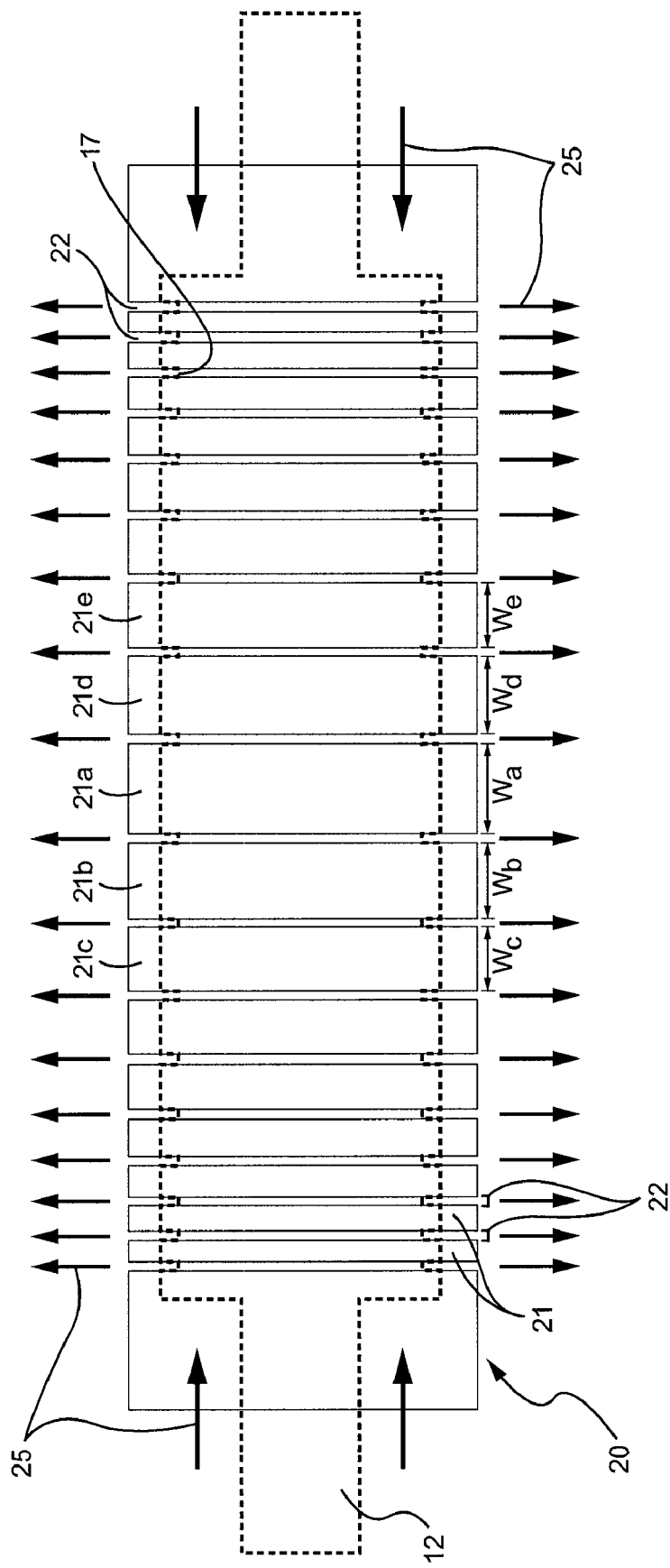
FIG. 2 is a side view of the cylindrical enclosure tube shown in FIG. 1.

FIG. 2 illustrates details of an exemplary embodiment of tube 20 enclosing other components of rotor 10 (e.g., core 12 illustrated in dashed line). Tube 20 is formed by a plurality of rings 21 which are axially separated from each other such that respective spaces 22 having a predetermined distance are defined between each of rings 21. Spaces 22 form radial discharge paths for a cooling fluid as illustrated by the arrows 25 indicating the directions of cooling gas flow. In particular, spaces 22 form radial discharge paths for venting cooling fluid to air gap 52. Spaces 22 are axially aligned with radial discharge paths 17 of core 12 so that cooling gas flows through a manifold of rotor 10 in the directions indicated by arrows 25.

The respective axial widths of rings 21 vary. For example, the axial width $W_a$ of ring 21a located at the axial center of tube 20 is larger than the axial width $W_b$ of adjacent ring 21b. The axial width $W_b$ of ring 21b is larger than the axial width $W_c$ of ring 21c. Similarly, axial width $W_a$ of ring 21a is larger than the axial width $W_d$ of ring 21d which is in turn larger than the axial width $W_e$ of ring 21e. The respective axial widths of rings 21 thus become progressively smaller as the axial distance from the center of tube 20 increases. The rings 21 located at the ends of cylinder 20 thus have the smallest axial width. Ring 21a located at the center of tube 20 has the largest axial width $W_a$.

By varying the respective axial widths of rings 21, the axial distance between successive spaces 22 varies. In particular, the axial distance between successive spaces 22 becomes progressively smaller as the axial distance from the center of tube 20 increases. Tube 20 would by itself thus provide a non-uniform distribution of cooling fluid flow due to the variable separation between spaces 22. By adjusting the respective axial widths of rings 21, the distance between successive spaces 22 forming radial discharge paths for cooling fluid may be adjusted.

Figure 3:
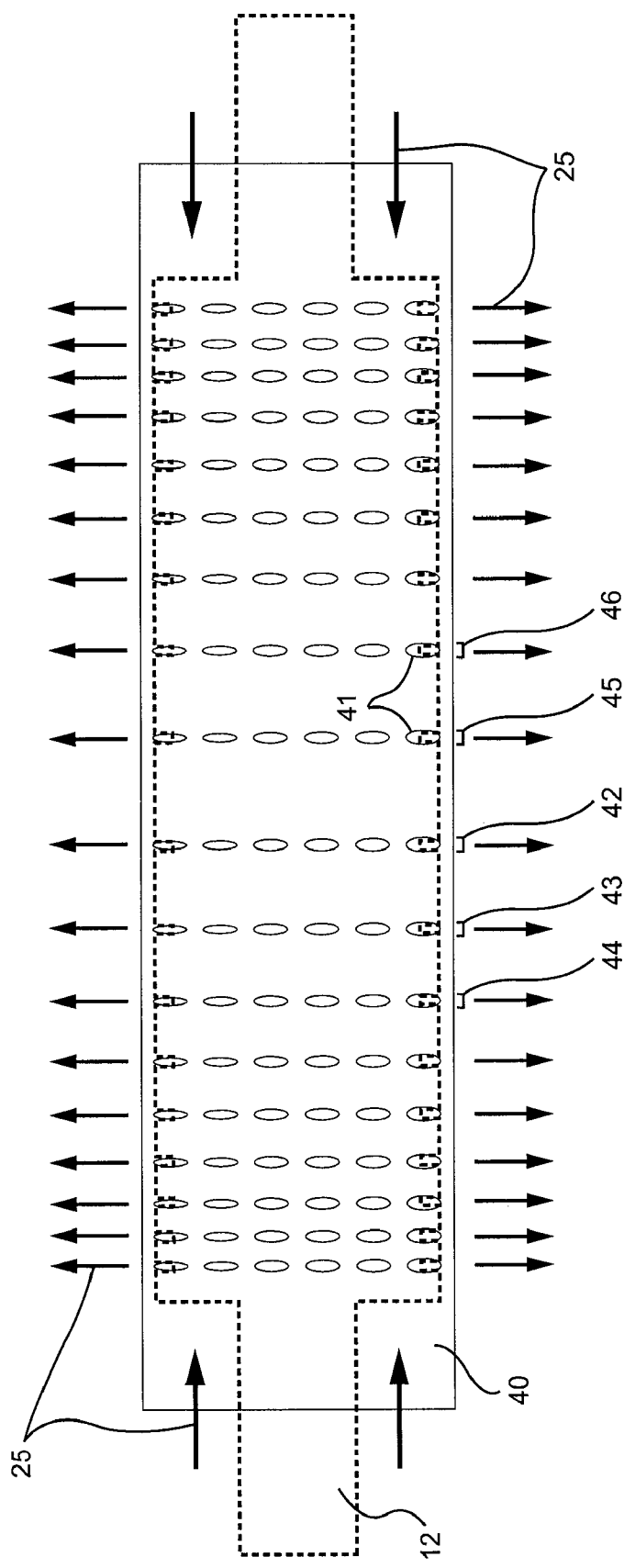
FIG. 3 is a side view of an exemplary embodiment of the shield shown in FIG. 1.
Figure 4:
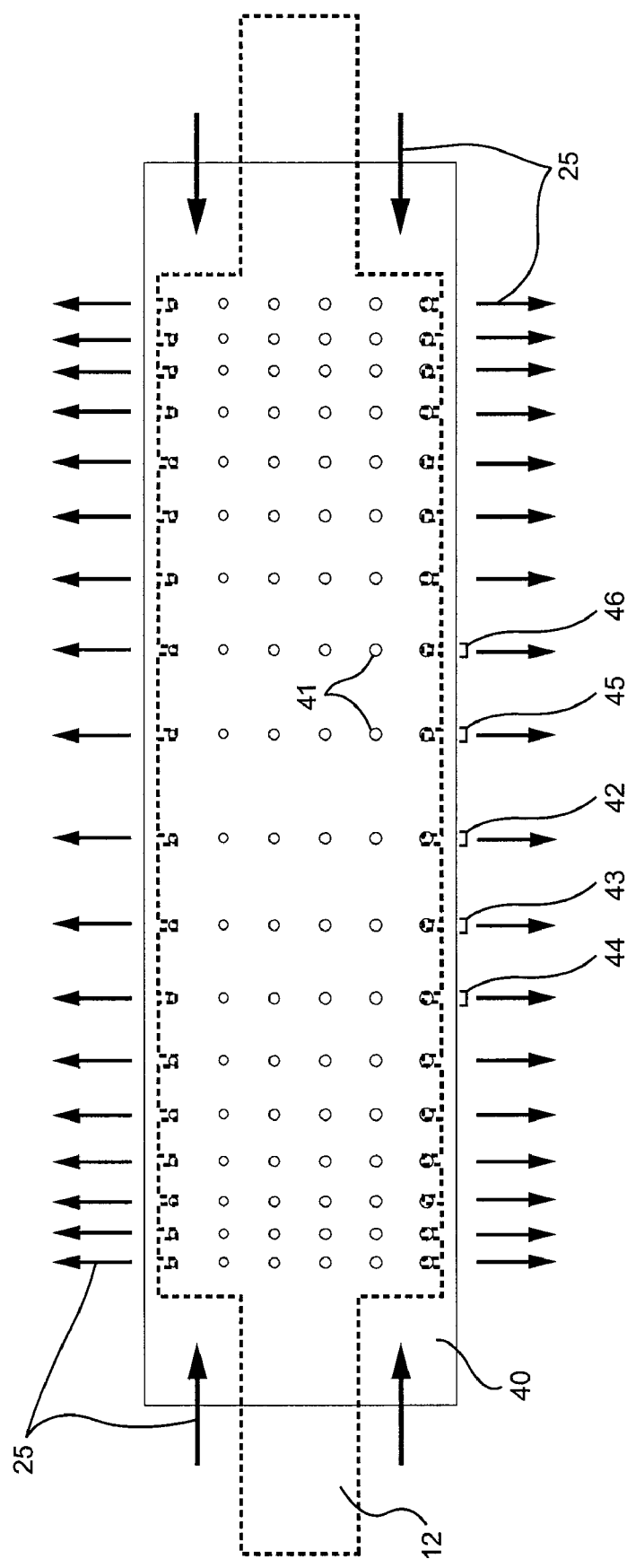
FIG. 4 is a side view of another exemplary embodiment of the shield shown in FIG. 1.

FIG. 3 illustrates details of an exemplary embodiment of shield 40. Shield 40 is formed of a continuous metallic body with a plurality of ventilation holes 41. Ventilation holes 41 formed in continuous cylindrical shield 40 provide discharge openings for venting cooling fluid to air gap 52 without introducing stress concentrations in shield 40 and/or tube 20. The flow of the cooling fluid through core 12 and shield 40 are demonstrated by arrows 25. Ventilation holes 41 may have an elliptical shape as illustrated in FIG. 3 or a circular shape as illustrated in the alternative exemplary embodiment shown in FIG. 4.

Ventilation holes 41 are aligned in respective axial rows. For example, a number of ventilation holes 41 (six ventilation holes 41 shown in FIG. 3) may be aligned in axial row 42. Each of these holes 41 in row 42 has an equal axial distance from the center of shield 40. Other axial rows 43–46 each comprising a plurality of ventilation holes 41, are also formed in shield 40. The rows of ventilation holes 41 are aligned with respective radial discharge paths 17 of core 12.

As illustrated in FIG. 3, the axial spacing between rows of ventilation holes 41 is non-uniform. The axial distance separating consecutive rows of ventilation holes 41 becomes progressively smaller as the axial distance from the center of shield 40 increases. For example, the axial distance between rows 44 and 43 is shorter than the distance between rows 43 and 42. Due to this non-uniform spacing of ventilation holes 41, the flow of cooling fluid provided by shield 40 would (by itself) be non-uniform.

As illustrated in FIG. 1, shield 40 is interposed between winding assemblies 30 and cylindrical tube 20. The axial rows of holes formed in shield 40 (shown in FIG. 3) are axially aligned with the spaces between rings 21 of tube 20 to establish the flow of cooling fluid illustrated by arrows 25. For example, axial row 42 of ventilation holes 41 formed in shield 40 is axially aligned with the space between rings 21a and 21b of cylindrical tube 20. Row 43 of ventilation holes 41 formed in shield 40 is axially aligned with the axial space between rings 21b and 21c of cylindrical tube 20. Row 45 of ventilation holes 41 formed in shield 40 is axially aligned with the space between rings 21a and 21d of cylindrical tube 20. As a final example, row 46 of ventilation holes 41 of shield 40 is axially aligned with the space between rings 21d and 21e of cylindrical tube 20. The rows of ventilation holes 41 are thus aligned with the axial spaces between successive rings 21 of cylindrical tube 20 to establish cooling fluid discharge paths shown by arrows 25.

Figure 5:
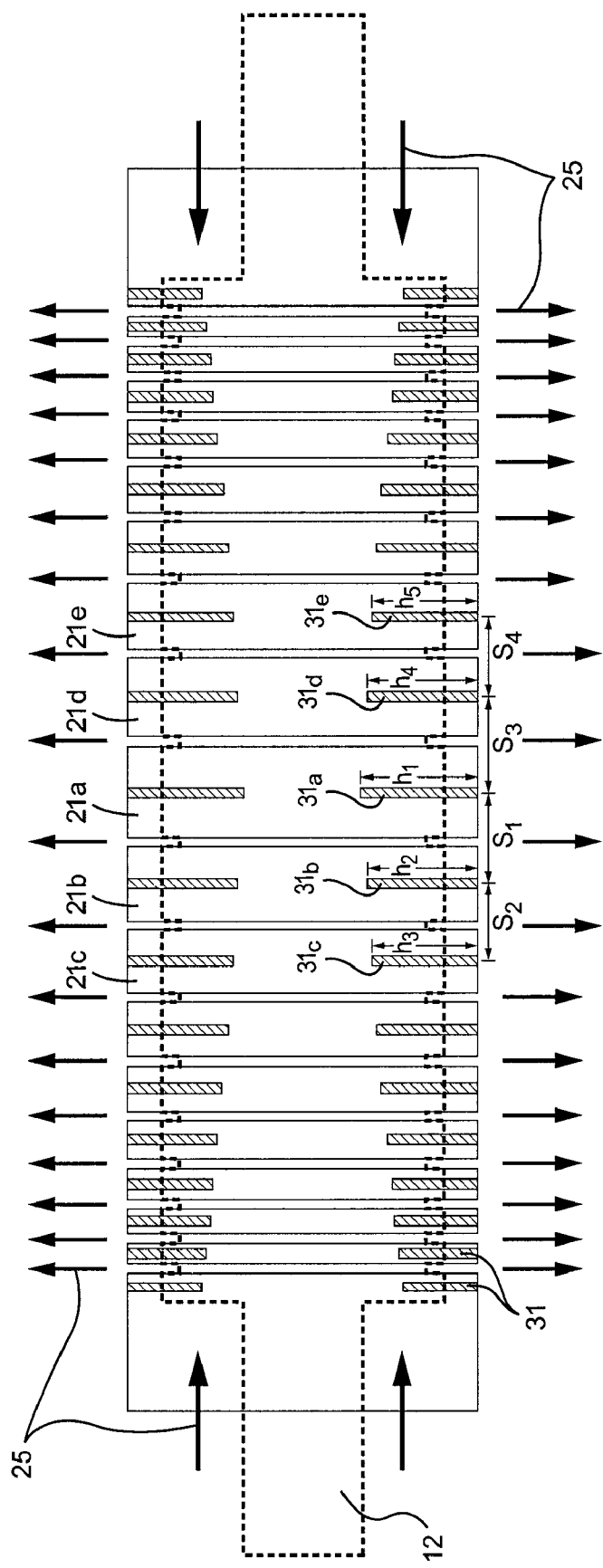
FIG. 5 is a cross-sectional view of a series of winding braces of variable radial height connected to the cylindrical enclosure tube shown in FIG. 1.
Figure 6:
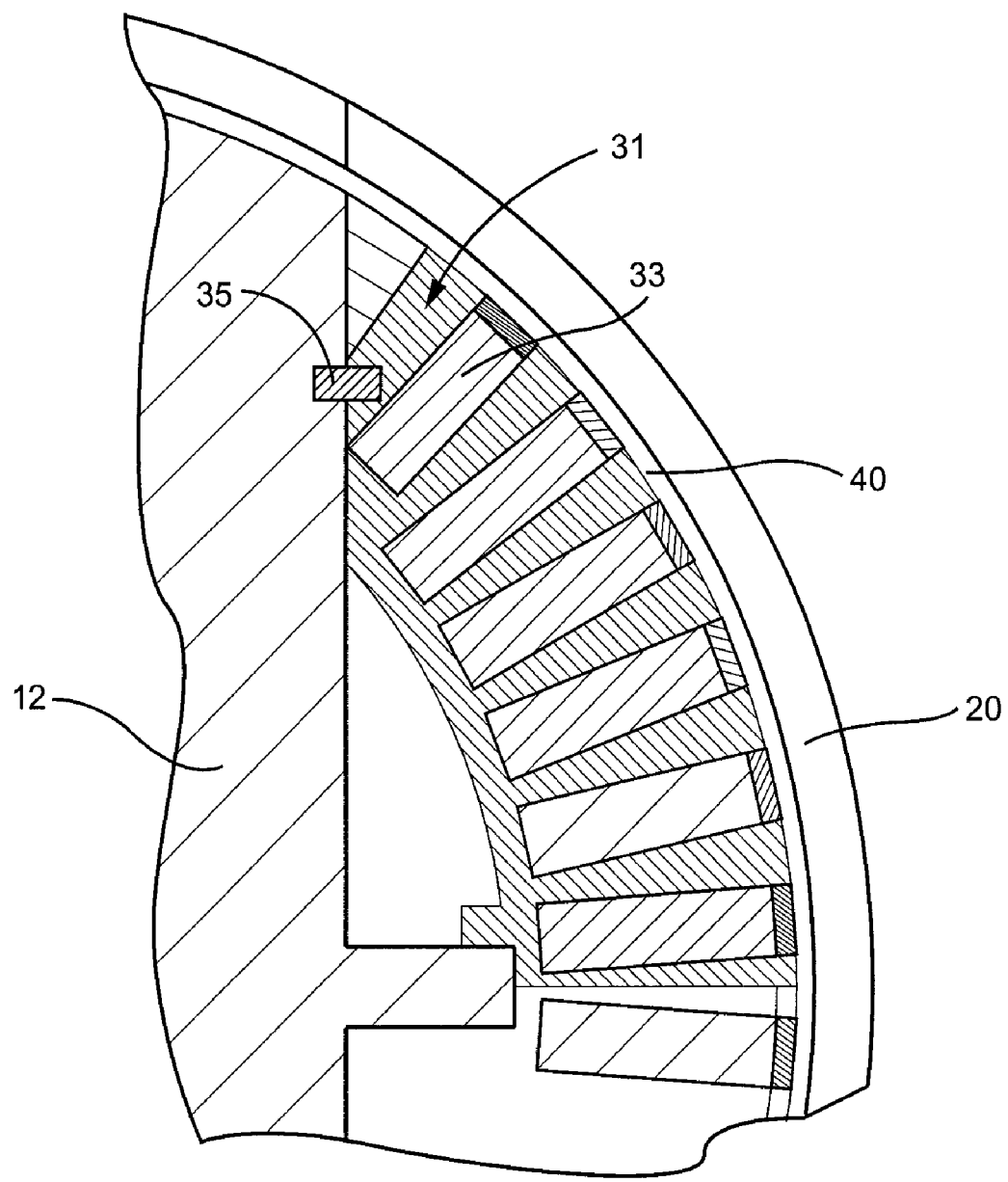
FIG. 6 is a partial sectional view illustrating one of the winding braces shown in FIG. 5.

FIGS. 5–6 illustrate a plurality of winding braces 31 coupled to tube 20 and core 12. Winding braces 31 connect windings 33 to core 12. In particular, a respective locking pin 35 connects each winding brace 31 to core 12 so that winding 33 may be connected to core 12.

Each of the winding braces 31 is also coupled to a respective one of the rings 21. As illustrated in FIG. 5, winding braces 31 have a variable radial height and a variable axial spacing. For example, the radial height h3 of winding brace 31c connected to ring 21c is smaller than the radial height h2 of winding brace 31b connected to ring 21b which is in turn smaller than the radial height h1 of winding brace 31a connected to the center-most ring 21a. Similarly, the radial height h5 of winding brace 31e connected to ring 21e is smaller than the radial height h4 of winding brace 31d connected to ring 21d which is in turn smaller than the radial height h1 of winding brace 31a connected to the center-most ring 21a. The respective radial heights of the winding braces 31 thus become progressively smaller as the distance away from the center of tube 20 increases.

The axial spacing between successive winding braces 31 also becomes progressively smaller as the axial distance from the center of tube 20 increases. For example, the axial spacing $S_2$ between the winding braces 31c and 31b is smaller than the axial spacing $S_1$ between the winding braces 31b and 31a. Similarly, the axial spacing $S_4$ between the winding braces 31e and 31d is smaller than the axial spacing $S_3$ between the winding braces 31d and 31a. The variable axial spacing of winding braces 31 counteracts the (otherwise) non-uniform distribution of cooling fluid flow emanating from tube 20 formed between the inner radial edge of the winding braces 31 and the shaft of the rotor 10. The radial discharge flow between each adjacent pair of winding braces 31 may be adjusted by changing the axial separation between those two winding braces 31 to obtain the desired flow of cooling fluid. Moreover, the radial height (e.g., $h_1$–$h_5$) of braces 31 may be adjusted to thus adjust the position of the inner radial edge of each winding brace 31 to throttle the flow of cooling fluid in the downstream tube 20. Accordingly, the axial spacing (e.g., $S_1$–$S_4$) of the winding braces 31 and the radial height (e.g., $h_1$–$h_5$) of winding braces 31 may each be adjusted to provide a more uniform rotor winding temperature. By adjusting the axial spacing and radial height of the winding braces 31, an overall distribution of cooling fluid flow in the rotor 10 and stator 50 that minimizes hot spots in both the stator and rotor windings may be achieved. Ventilation may be provided without introducing stress concentrations in tube 20. The rotor assembly can thus be simplified and the risk of local damage to individual pieces is isolated as opposed to requiring replacement of the entire containment structure.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotor in an electrical machine, the rotor comprising:
   a magnetic core having at least two poles;
   a plurality of winding assemblies, one for each pole; and
   a cylindrical tube enclosing the magnetic core and winding assemblies, the tube including a plurality of rings having different axial widths.

2. A rotor as in claim 1 wherein the tube is formed of a non-metallic material.

3. A rotor as in claim 1 wherein each of the rings is axially spaced apart from an adjacent ring.

4. A rotor as in claim 3 wherein the rings are axially spaced apart such that radial discharge slots defined in the magnetic core are axially aligned with respective spaces between the rings.

5. A rotor as in claim 1 wherein the respective axial widths of the rings at both axial ends of the tube are smaller than the axial width of the ring axially located at or near the center of the tube.

6. A rotor as in claim 1 wherein the respective axial widths of the rings become progressively smaller than the axial width of the ring axially located at or near the center of the tube as the axial distance away from the center of the tube increases.

7. A rotor as in claim 1 wherein the rotor further comprises a plurality of winding braces coupled to at least one of the winding assemblies, the winding braces having different radial heights.

8. A rotor as in claim 7 wherein the radial heights of the winding braces located at both axial ends of the tube are smaller than the radial height of the winding brace axially located at or near the center of the tube.

9. A rotor as in claim 7 wherein the respective radial heights of the winding braces become progressively smaller than the radial height of the winding brace axially located at or near the center of the tube as the axial distance away from the center of the tube increases.

10. A rotor as in claim 1 wherein the rotor further comprises a plurality of winding braces coupled to at least one of the winding assemblies and axially spaced apart from each other, the axial distance between one pair of adjacent winding braces being different than the axial distance between another pair of adjacent winding braces.

11. A rotor as in claim 10 wherein the respective axial distances between the winding braces located at the ends of the tube are smaller than the axial distance between the winding braces located at or near the center of the tube.

12. A rotor as in claim 10 wherein the respective axial distances between adjacent winding braces become progressively smaller than the axial distance between adjacent winding braces axially located at the center of the tube as the axial distance away from the center of the tube increases.

13. A rotor as in claim 1 further comprising a shield having a plurality of ventilation holes defined therein, the shield being disposed between (i) the tube and (ii) the magnetic core and winding assemblies.

14. A rotor as in claim 13 wherein the ventilation holes are circular.

15. A rotor as in claim 13 wherein the ventilation holes are elliptical.

16. A rotor as in claim 13 wherein the ventilation holes are aligned in respective rows in the axial direction of the shield, and the respective rows of ventilation holes are axially aligned with respective axial spaces defined between the rings.

17. A rotor as in claim 13 wherein the ventilation holes are aligned in respective rows in the axial direction of the shield and the axial distance between the rows is non-uniform.

18. A rotor as in claim 17, wherein the distance between the rows of ventilation holes formed in the shield become progressively smaller as the axial distance away from the center of the shield increases.

19. A cylindrical tube for enclosing rotor components including a magnetic core having at least two poles and a plurality of winding assemblies, the cylindrical tube comprising a plurality of rings having different axial widths.

20. A cylindrical tube as in claim 19 wherein the tube is formed of a non-metallic material.

21. A cylindrical tube as in claim 19 wherein each of the rings is axially spaced apart from an adjacent ring.

22. A cylindrical tube as in claim 21 wherein the rings are axially spaced apart such that radial discharge slots defined in the magnetic core are axially aligned with respective spaces between the rings.

23. A cylindrical tube as in claim 19 wherein the respective axial widths of the rings at both axial ends of the tube are smaller than the axial width of the ring axially located at the center of the tube.

24. A cylindrical tube as in claim 19 wherein the respective axial widths of the rings become progressively smaller than the axial width of the ring axially located at the center of the tube as the axial distance away from the center of the tube increases.

* * * * *